(12) United States Patent
Park et al.

(10) Patent No.: US 11,115,233 B2
(45) Date of Patent: Sep. 7, 2021

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Taehwan Park, Seoul (KR); ChoongSeob Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/919,912

(22) Filed: Jul. 2, 2020

(65) Prior Publication Data

US 2021/0119825 A1 Apr. 22, 2021

(30) Foreign Application Priority Data

Oct. 16, 2019 (KR) .......................... 10-2019-0128454

(51) Int. Cl.
*H04L 12/40* (2006.01)
*H04L 12/403* (2006.01)
*H04L 29/12* (2006.01)
*H04L 12/931* (2013.01)

(52) U.S. Cl.
CPC ...... *H04L 12/40013* (2013.01); *H04L 12/403* (2013.01); *H04L 49/351* (2013.01); *H04L 61/20* (2013.01); *H04L 61/6022* (2013.01); *H04L 2012/40273* (2013.01)

(58) Field of Classification Search
CPC ............. H04L 12/40013; H04L 12/403; H04L 49/351; H04L 61/20; H04L 61/6022; H04L 2012/40273
USPC .................................................. 370/351, 389
See application file for complete search history.

(56) References Cited

U.S. PATENT DOCUMENTS

| | | | | |
|---|---|---|---|---|
| 2015/0326488 | A1* | 11/2015 | Yousefi | H04L 49/25 370/417 |
| 2016/0159281 | A1* | 6/2016 | Jang | B60R 1/00 348/148 |
| 2019/0319820 | A1* | 10/2019 | Ogawa | H04L 12/40163 |
| 2020/0172028 | A1* | 6/2020 | Kawauchi | B60W 50/00 |

* cited by examiner

*Primary Examiner* — Obaidul Huq

(57) ABSTRACT

A vehicle includes an image generation controller configured to generate a plurality of image frames, to assign a first MAC address to a first image frame of the plurality of image frames, and to assign a second MAC address to a second image frame of the plurality of image frames; an Ethernet switch including a plurality of Ethernet ports, configured to transmit the first image frame to a first image receiving controller and a second image receiving controller based on the first MAC address, and to transmit the second image frame to the second image receiving controller based on the second MAC address; the first image receiving controller configured to receive the first image frame, and to image process the first image frame; and the second image receiving controller configured to receive the first and second image frame, and to process the first and second image frame.

17 Claims, 6 Drawing Sheets

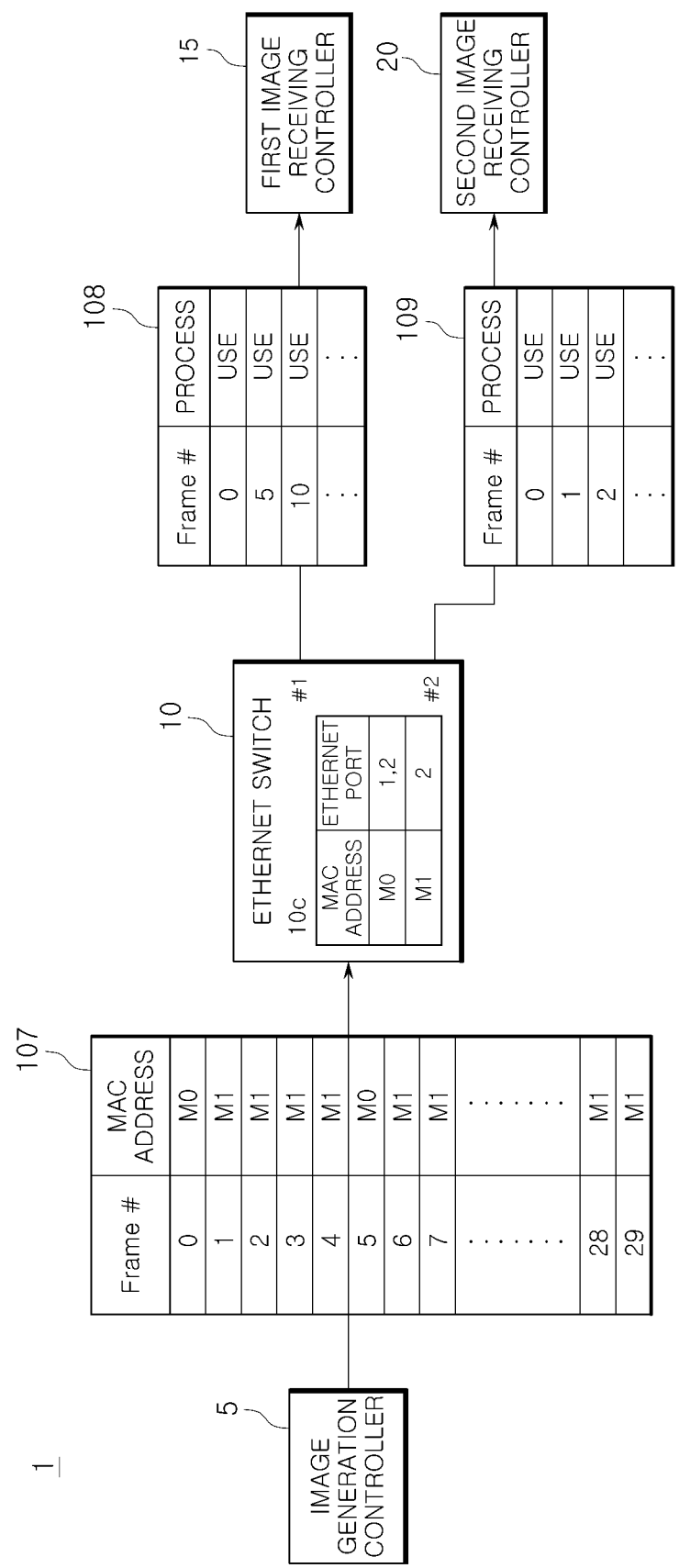

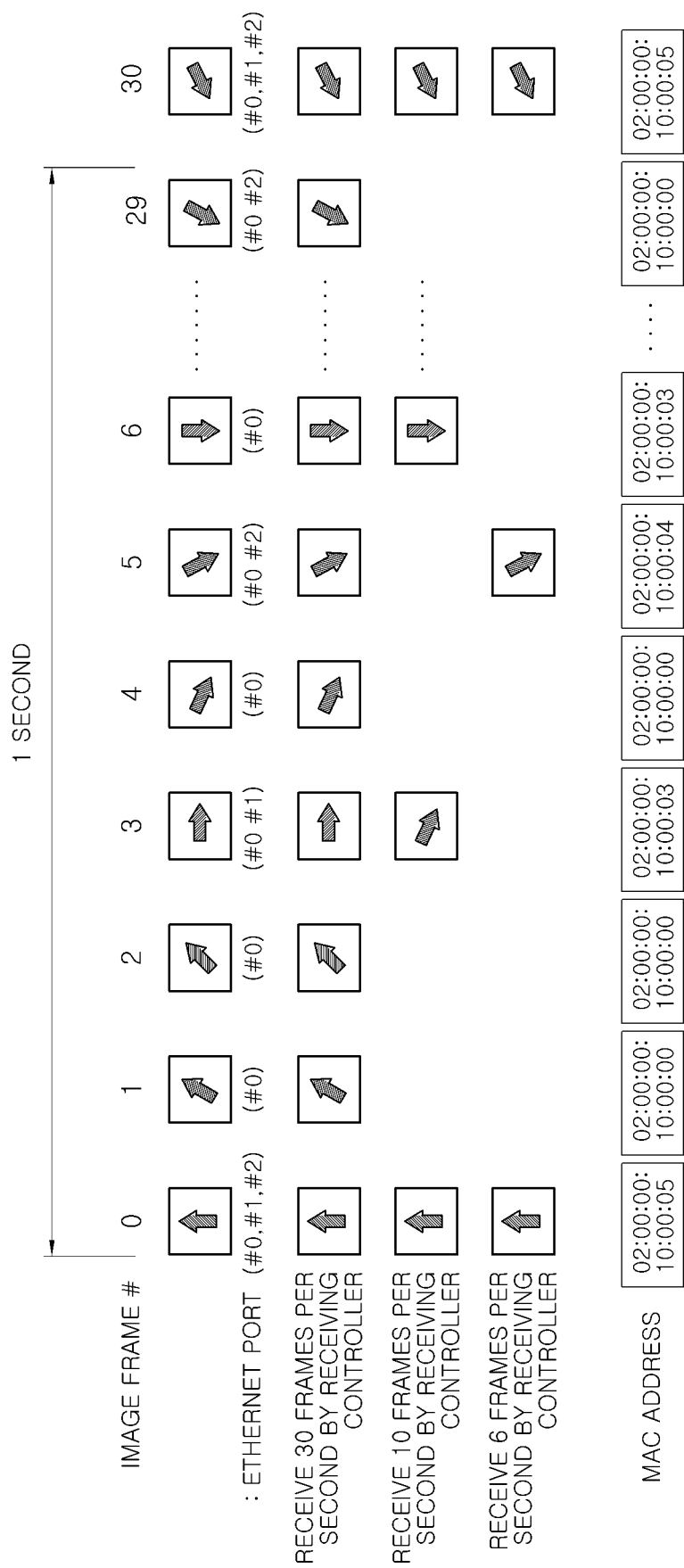

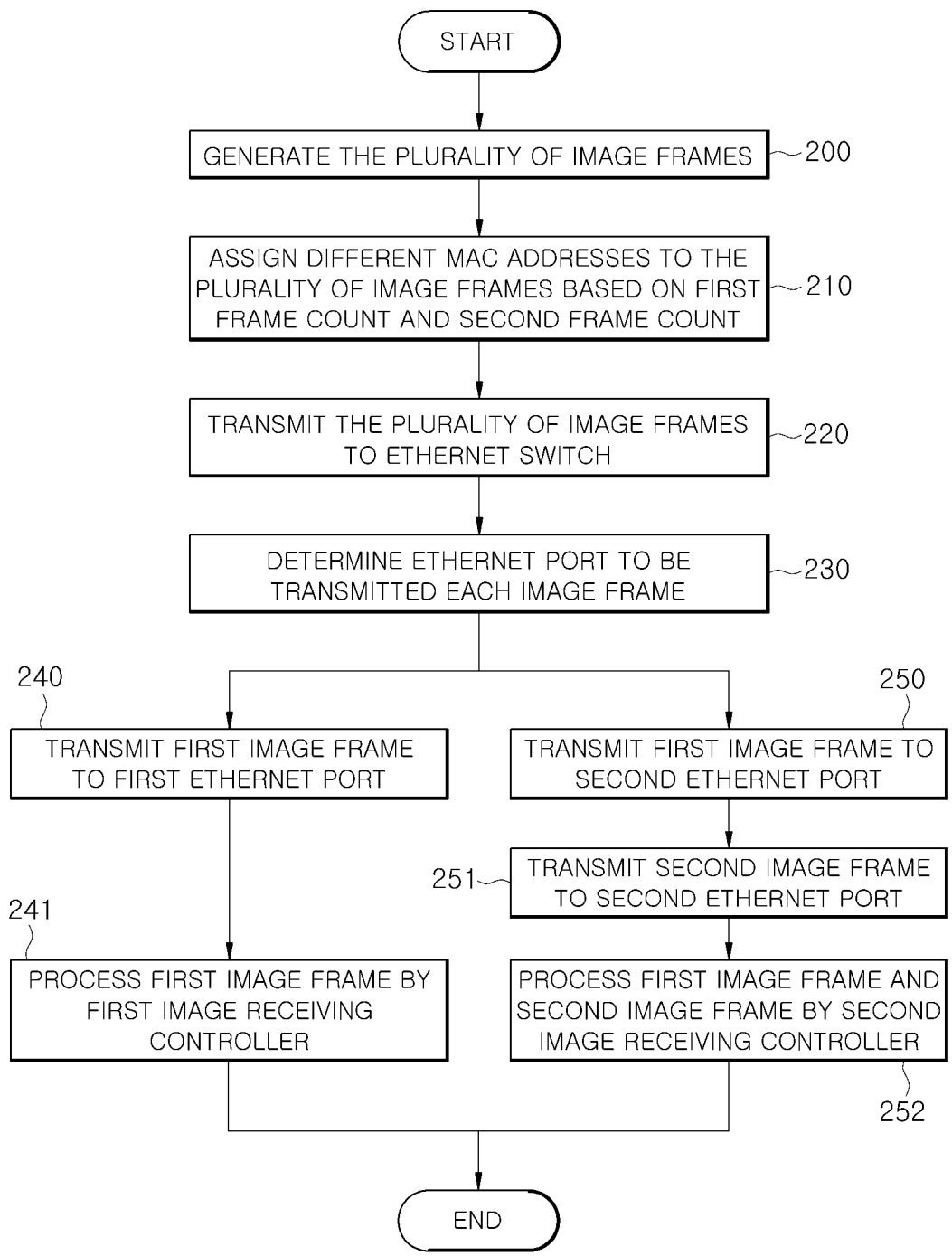

VEHICLE AND METHOD OF CONTROLLING THE SAME

CROSS-REFERENCE TO RELATED APPLICATION

The present application claims priority to and the benefit of Korean Patent Application No. 10-2019-0128454, filed on Oct. 16, 2019, which is incorporated by reference in its entirety.

TECHNICAL FIELD

The disclosure relates to a vehicle performing Ethernet communication between controllers, and a method of controlling the vehicle.

BACKGROUND

The statements in this section merely provide background information related to the present disclosure and may not constitute prior art.

A vehicle includes various electronic control units (ECUs). The vehicle may construct a communication network for communication between the ECUs.

In the related art, the vehicle uses a method such as a media oriented system transport (MOST) or a low voltage differential signal (LVDS) is used as the communication network in order to internally transmit multimedia related image data. Recent advances in technology, such as autonomous driving, require high-speed processing of image data, and accordingly, commercial Ethernet (Ethernet) methods have been introduced to communication networks.

Conventionally, the vehicle may detect a lane through the image data generated by the ECU such as a camera, or may display the lane on a display for a driver to see. That is, since the captured image data may be used in the ECUs, the vehicle includes an Ethernet switch for distributing the image data.

The ECU for processing the generated image data has different required frame counts according to its purpose and function. However, the Ethernet switch of the conventional vehicle transmits all a plurality of image frames included in the image data to the ECUs having different frame counts, and has a problem of degrading the performance of high-speed processing for using Ethernet communication.

SUMMARY

Therefore, it is an aspect of the disclosure to provide a vehicle capable of receiving an image frame without unnecessary increase of an Ethernet communication speed by assigning a media access control (MAC) address in video frame units and mapping MAC address to ports of the Ethernet switch based on the number of video frames required by ECUs, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes an image generation controller configured to generate a plurality of image frames, to assign a first MAC address to a first image frame of the plurality of image frames, and to assign a second MAC address to a second image frame of the plurality of image frames; an Ethernet switch including a plurality of Ethernet ports, configured to transmit the first image frame to a first image receiving controller and a second image receiving controller based on the first MAC address, and to transmit the second image frame to the second image receiving controller based on the second MAC address; the first image receiving controller configured to receive the first image frame, and to image process the first image frame; and the second image receiving controller configured to receive the first image frame and the second image frame, and to image process the first image frame and the second image frame.

The image generation controller may be configured to assign the first MAC address and the second MAC address to the plurality of image frames based on a first frame count and a second frame count.

The Ethernet switch may include a first Ethernet port connected to the first image receiving controller; and a second Ethernet port connected with the second image receiving controller.

The Ethernet switch may be configured to store an access control list (ACL) matching the first Ethernet port and the second Ethernet port together in the first MAC address.

The Ethernet switch may be configured to route the first Ethernet port to the first image receiving controller based on the ACL.

The Ethernet switch may be configured to route the second Ethernet port to the second image receiving controller based on the ACL.

The image generation controller may be configured to compare a first frame count and a second frame count, to assign the first MAC address to the first image frame based on the comparison result, and to assign the second MAC address to the second image frame.

The image generation controller may include a camera. The first image receiving controller may include an image recognition device. The second image receiving controller may include an audio video navigation (AVN).

The image generation controller may be configured to generate the image frame based on a maximum frame count among the first frame count and the second frame count.

In accordance with another aspect of the disclosure, in a method of controlling a vehicle, the vehicle includes an image generation controller, an Ethernet switch, and a plurality of image receiving controllers. The method includes generating, by the image generation controller, a plurality of image frames; assigning, by the image generation controller, a first MAC address to a first image frame of the plurality of image frames, and assigning a second MAC address to a second image frame of the plurality of image frames; transmitting, by the Ethernet switch, the first image frame to a first image receiving controller and a second image receiving controller based on the first MAC address, and transmitting the second image frame to the second image receiving controller based on the second MAC address; receiving, by the first image receiving controller, the first image frame; receiving, by the second image receiving controller, the first image frame and the second image frame; and processing, by the first image receiving controller and the second image receiving controller, the received image frame.

The assigning may include assigning the first MAC address and the second MAC address to the plurality of image frames based on a first frame count and a second frame count.

The Ethernet switch may include a first Ethernet port connected to the first image receiving controller; and a second Ethernet port connected with the second image receiving controller.

The method may further include storing, by the Ethernet switch, an access control list (ACL) matching the first Ethernet port and the second Ethernet port together in the first MAC address.

The transmitting may include routing the first Ethernet port to the first image receiving controller based on the ACL.

The transmitting may include routing the second Ethernet port to the second image receiving controller based on the ACL.

The assigning may include comparing a first frame count and a second frame count, assigning the first MAC address to the first image frame based on the comparison result, and assigning the second MAC address to the second image frame.

The assigning may include assigning a first MAC address to a fourth MAC address to the plurality of image frames based on the first frame count, the second frame count, and a third frame count.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a view for describing an Ethernet communication method of a vehicle in one form of the present disclosure;

FIG. 5 is a view for describing a communication method for each image frame in one form of the present disclosure; and FIG. 6 is a flowchart illustrating a method of controlling a vehicle in one form of the present disclosure.

Figure 1:
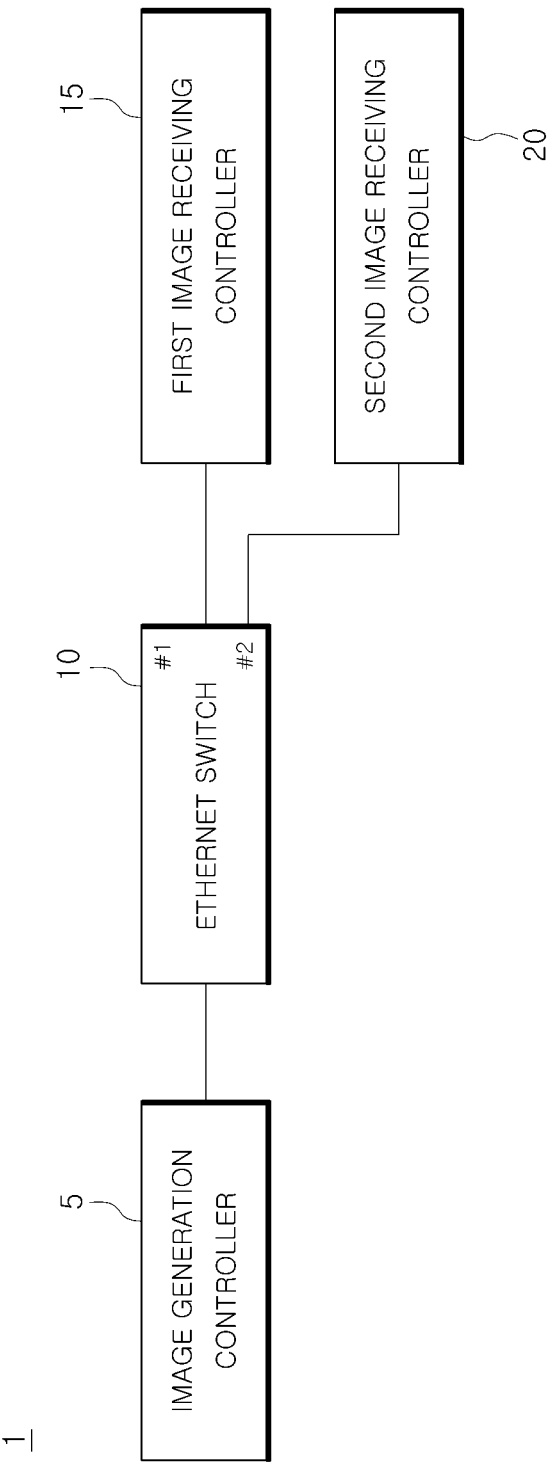
FIG. 1 is a control block diagram of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of exemplary forms of the disclosure will be described, and description of what are commonly known in the art or what overlap each other in the forms will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

FIG. 1 is a control block diagram of a vehicle in some forms of the present disclosure.

Referring to FIG. 1, a vehicle 1 may include an image generation controller 5 for generating a plurality of image frames, an Ethernet switch 10 including a plurality of Ethernet ports, and a first image receiving controller 15 and a second image receiving controller 20 respectively connected to the plurality of Ethernet ports.

The image generation controller 5 may capture peripheral or internal images of the vehicle 1 and convert the captured image signal into the plurality of image frames. In order to generate the plurality of image frames, the image generation controller 5 may include a complementary metal-oxide semiconductor (CMOS) sensor or a charge coupled device (CCD) sensor that converts light input through a lens into an electrical signal.

The image generation controller 5 may transmit the image frame generated from the converted electrical signal to the Ethernet switch 10 through Ethernet communication. To this end, the image generation controller 5 may assign a media access control (MAC) address of the Ethernet communication to the plurality of image frames.

The image generation controller 5 may generate an image with frame counts required by the image receiving controllers 15 and 20 when assigning the MAC address. For example, when the first image receiving controller 15 processes the image at 30 frames per second, the image generation controller 5 may assign the MAC address to each of the 30 image frames. However, when the second image receiving controller 20 processes the image at 6 frames per second, the image generation controller 5 may assign a first MAC address (M0 of FIG. 4) to 5 image frames among image frames and a second MAC address (M1 of FIG. 4) to the remaining 25 image frames.

The image generation controller 5 may transmit the image frame including the MAC address assigned through the Ethernet communication, that is, an Ethernet message, to the Ethernet switch 10.

The Ethernet switch 10 may perform routing to the Ethernet ports #1 and #2 defined in an access control list (ACL) based on the MAC address corresponding to a destination of the received Ethernet message.

The ACL is a routing table based on a preset Ethernet MAC address, and may include a single MAC address that simultaneously matches a first Ethernet port and a second Ethernet port. In detail, the Ethernet switch 10 may determine the first MAC address (M0 of FIG. 4) assigned to 5 image frames among the received 30 image frames. The ACL matches the first Ethernet port #1 and the second Ethernet port #2 to the first MAC address. The Ethernet switch 10 may transmit 5 image frames to the first image receiving controller 15 through the first Ethernet port #1, and may transmit 5 image frames transmitted to the first image receiving controller 15 to the second image receiving controller 20 through the second Ethernet port #2.

Through this, the vehicle 1 may process the image frames required for the image receiving controllers 15 and 20 without unnecessary increase of the Ethernet communication speed. A specific form of the present disclosure in which the image generation controller 5 and the Ethernet switch 10 operate will be described in detail later with reference to FIG. 4.

Meanwhile, although the Ethernet switch 10 is illustrated as including two Ethernet ports #1 and #2 in FIG. 1, the Ethernet switch 10 is not necessarily limited thereto. The Ethernet switch 10 may further include a plurality of ports according to the number of connected the image generation controller 5 and the image receiving controllers 15 and 20.

The first image receiving controller 15 and the second image receiving controller 20 may receive the image frame transmitted by the Ethernet switch 10 and then image process the image frame. The first image receiving controller 15 and the second image receiving controller 20 may process the image and then extract meaningful information or display the processed image. For example, the first image receiving controller 15 may be a device that recognizes a lane or a preceding vehicle from the image captured by the image generation controller 5. In addition, the second image receiving controller 20 may be an audio video navigation (AVN) module that displays the image captured by the image generation controller 5 on a display for a user to view.

The first image receiving controller 15 and the second image receiving controller 20 may determine the frame counts according to the purpose and function of the controller. The first image receiving controller 15 and the second image receiving controller 20 may process the image frames transmitted through the Ethernet ports by the Ethernet switch 10 according to the frame counts.

Meanwhile, the above-described configuration in FIG. 1 is not necessarily limited to the names referred to, and may include various devices for performing the above-described functions.

Figure 2:
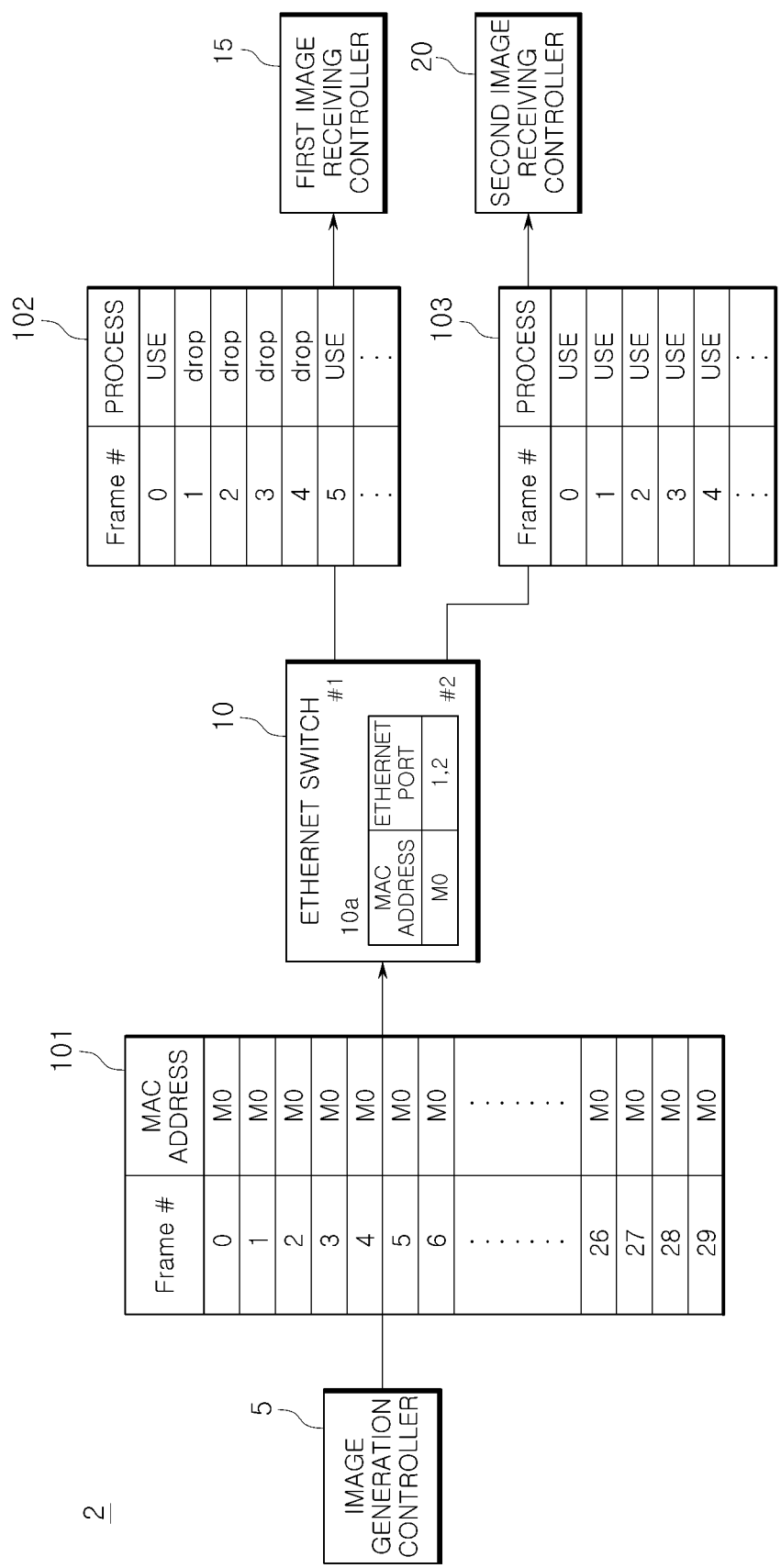
FIGS. 2 and 3 are views for describing a problem that may occur in Ethernet communication performed in a conventional vehicle.
Figure 3:
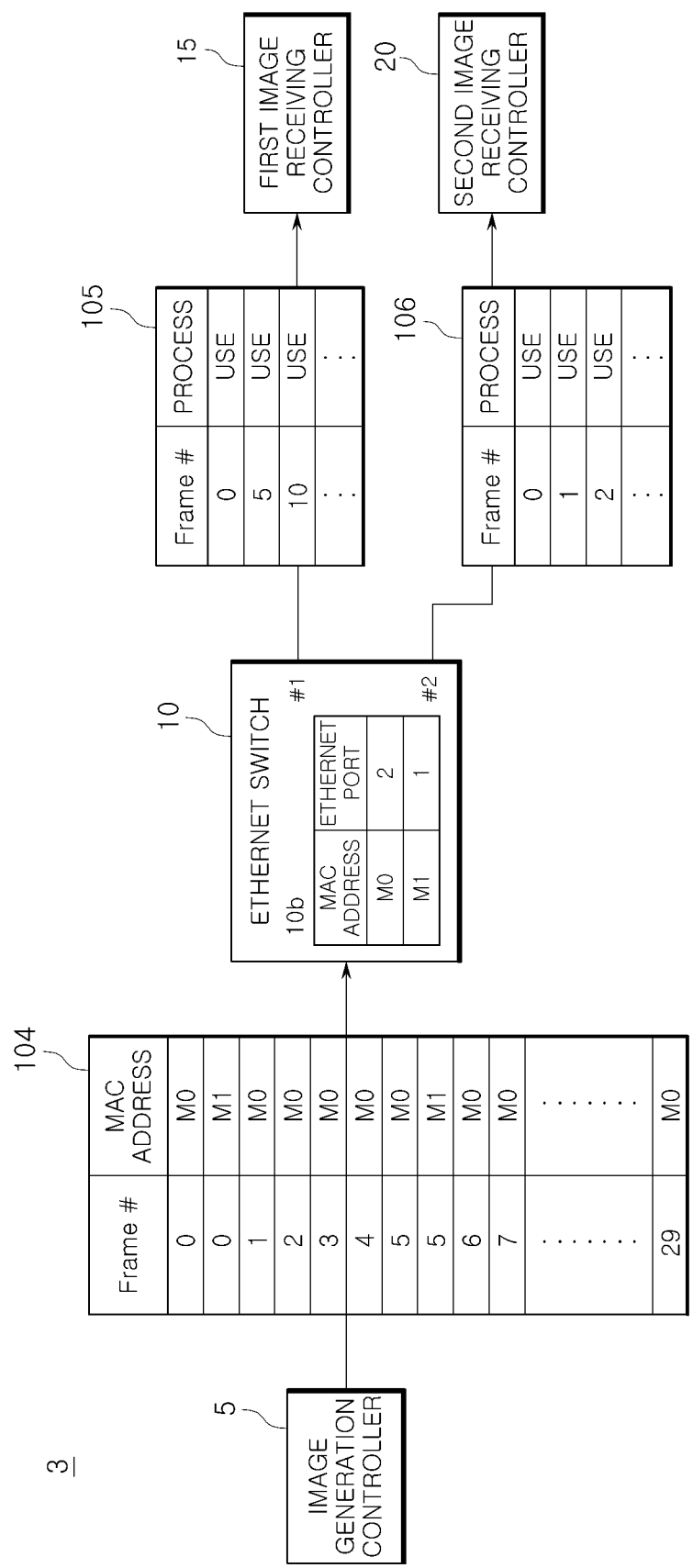

FIGS. 2 and 3 are views for describing a problem that may occur in Ethernet communication performed in a conventional vehicle.

A conventional vehicle 2 using the Ethernet communication may transmit the image frames to the first image receiving controller 15 and the second image receiving controller 20 through the Ethernet switch 10. However, conventional vehicles 2 and 3 have a problem of transmitting the image frames to the plurality of image receiving controllers 15 and 20 repeatedly or generating the same image frames.

Referring to FIG. 2, when the image frame generated by the image generation controller 5 is transmitted to the plurality of image receiving controllers 15 and 20, the image generation controller 5 of the conventional vehicle 2 may transmit the image frame in the image receiving controller having the maximum frame counts among the image receiving controllers 15 and 20 to be received, for example, 30 frames of the second image receiving controller 20.

In particular, the image generation controller 5 may generate 30 image frames and assign the MAC address M0 for each image frame as illustrated in Table 101. The image generation controller 5 may transmit an Ethernet message including the assigned MAC address to the Ethernet switch 10.

The Ethernet switch 10 of the conventional vehicle 2 may include a routing table 10*a*. The routing table 10*a* of the conventional vehicle 2 may match the plurality of Ethernet ports #1 and #2 to the MAC address M0.

The Ethernet switch 10 may transmit a first image frame Frame #0 to a thirtieth image frame Frame #29 to the first image receiving controller 15 through the first Ethernet port #1 by the routing table 10*a*.

The first image receiving controller 15 of the conventional vehicle 2 may receive 30 image frames for 1 second. When the frame counts of the first image receiving controller 15 is 6, the first image receiving controller 15 may image process the first image frame Frame #0. As illustrated in Table 102, the first image receiving controller 15 may drop a second image frame Frame #1 to a fifth image frame Frame #4. That is, the first image receiving controller 15 may use only the first image frame Frame #0, a sixth image frame Frame #5, an eleventh image frame Frame #10, a sixteenth image frame Frame #15, a twenty-first image frame Frame #20, and a twenty-sixth image frame Frame #25 for image processing.

The second image receiving controller 20 of the conventional vehicle 2 may receive 30 image frames for 1 second. When the frame counts of the second image receiving controller 20 is 30, the second image receiving controller 20 may image process all of the first image frame Frame #0 to the thirtieth image frame Frame #29 (Table 103).

In a control method of FIG. 2, since 30 image frames must be transmitted at the Ethernet communication speed of 30 frame counts to the first image receiving controller 15 that needs to transmit 6 image frames, an unnecessary Ethernet communication speed is required.

Referring to FIG. 3, when the image frame generated by the image generation controller 5 is transmitted to the plurality of image receiving controllers 15 and 20, the image generation controller 5 of the conventional vehicle 3 may independently generate the image frame to be used by the image receiving controllers 15 and 20.

When the frame counts of the first image receiving controller 15 is 6 and the frame counts of the second image receiving controller 20 is 30, the image generation controller 5 may generate 36 image frames. The image generation controller 5 may assign the second MAC address M1 to 6 image frames to be used by the first image receiving controller 15.

As illustrated in Table 104, the image generation controller 5 may assign the second MAC address M1 to the first image frame Frame #0, the sixth image frame Frame #5, the eleventh image frame Frame #10, and the sixteenth image frame Frame #15, the twenty-first image frame Frame #20, and the twenty-sixth image frame Frame #25.

The image generation controller 5 may assign the first MAC address M0 to 30 image frames to be used by the second image receiving controller 20. As illustrated in Table 104, the image generation controller 5 may assign the first MAC address M0 from the first image frame Frame #0 to the thirtieth image frame Frame #29.

The image generation controller 5 may transmit 36 image frames to which the MAC addresses M0 and M1 are assigned, to the Ethernet switch 10.

The Ethernet switch 10 of the conventional vehicle 3 may include a routing table 10b. The Ethernet switch 10 may match the first MAC address M0 with the second Ethernet port #2 based on the routing table 10b. The Ethernet switch 10 may match the second MAC address M1 with the first Ethernet port #1 based on the routing table 10b.

As illustrated in Table 105, the Ethernet switch 10 may transmit the first image frame Frame #0, the sixth image frame Frame #5, the eleventh image frame Frame #10, the sixteenth image frame Frame #15, the twenty-first image frame Frame #20, and the twenty-sixth image frame Frame #25 to the first image receiving controller 15 through the first Ethernet port #1.

The first image receiving controller 15 of the conventional vehicle 3 may receive 6 image frames for 1 second and then image process the received image frames.

As illustrated in Table 106, the Ethernet switch 10 may transmit from the first image frame Frame #0 the thirtieth image frame Frame #29 to the second image receiving controller 20 through the second Ethernet port #2.

The second image receiving controller 20 of the conventional vehicle 3 may receive 30 image frames for 1 second and then image process the received image frames.

In a control method of FIG. 3, since the frame counts transmitted by the image generation controller 5 to the Ethernet switch 10 increases from 30 to 36, an increase in the Ethernet communication speed is inevitably accompanied. In addition, since the image generation controller 5 duplicates the same first image frame Frame #0, a difference occurs between a transmission time between the first image frame Frame #0 and the second image frame Frame #1 and a transmission time between the second image frame Frame #1 and the third image frame Frame #2. That is, since the image receiving controllers 15 and 20 receive the plurality of image frames having different transmission intervals, the difficulty of image processing may increase.

FIG. 4 is a view for describing an Ethernet communication method of a vehicle in some forms of the present disclosure.

The image generation controller 5 of the vehicle 1 may compare the frame counts of the image receiving controllers 15 and 20 to be received the image frames, and may generate the plurality of image frames based on the maximum frame counts. Referring to FIG. 4, when the frame counts of the first image receiving controller 15 is 6 and the frame counts of the second image receiving controller 20 is 30, the image generation controller 5 may assign different MAC addresses to 30 image frames to be transmitted per second.

The image generation controller 5 may assign different MAC addresses M0 and M1 to the image frames corresponding to the smaller frame counts among the frame counts of the first image receiving controller 15 and the frame counts of the second image receiving controller 20 among the plurality of generated image frames.

Referring to Table 104, the image generation controller 5 may assign the first MAC address M0 to the first image frame Frame #0, the sixth image frame Frame #5, the eleventh image frame Frame #10, and the sixteenth image frame Frame #15, the twenty-first image frame Frame #20, and the twenty-sixth image frame Frame #25. The image generation controller 5 may assign the second MAC address M1 to the remaining image frames except for the image frame to which the first MAC address M0 is assigned.

The image generation controller 50 may transmit 30 image frames assigned different MAC addresses to the Ethernet switch 10.

The Ethernet switch 10 may match the first Ethernet port #1 and the second Ethernet port #2 to the first MAC address M0 together, and may store in advance the ACL 10c in which the second Ethernet port #2 is matched with the second MAC address M1.

The Ethernet switch 10 may transmit the first image frame Frame #0, the sixth image frame Frame #5, and the eleventh image frame Frame #10, the sixteenth image frame Frame #15, the twenty-first image frame Frame #20, and the twenty-sixth image frame Frame #25 to which the first MAC address M0 based on the ACL 10c to the first image receiving controller 15 and the second image controller 20.

The Ethernet switch 10 may transmit 24 image frames (e.g., Frame #1, #2, etc.) assigned the second MAC address M1 to the second image receiving controller 20 based on the ACL 10c.

As illustrated in Table 108, the first image receiving processor 15 may use the received first image frame Frame #0, the sixth image frame Frame #5, the eleventh image frame Frame #10, and the like for image processing.

As illustrated in Table 109, the second image receiving processor 20 may use all of the received first image frames Frame #0 to 30th image frames thirtieth image frame Frame #29 for image processing.

Through this, the vehicle 1 may receive image data according to the frame counts required by the image receiving controllers 15 and 20, and furthermore, since the image receiving controllers 15 and 20 can receive the image frames through a predetermined transmission interval, the difficulty of image processing may be reduced.

FIG. 5 is a view for describing a communication method for each image frame in some forms of the present disclosure.

In some forms of the present disclosure, the vehicle 1 may transmit the image frame to three image receiving controllers 15, 20, and 25 by the image generation controller 5. In such forms of the present disclosure, the Ethernet switch 10 may include three Ethernet ports.

Particularly, the three image receiving controllers 15, 20, and 25 may have different frame counts. As illustrated in FIG. 5, the first image receiving controller 15 may have 30 frames, the second image receiving controller 20 may have 10 frames, and the third image receiving controller 25 may have 6 frames.

The image generation controller 5 may compare three frame counts and assign 4 MAC addresses to 30 image frames corresponding to the maximum frame counts based on the comparison result. That is, the image generation controller 5 may assign different MAC addresses to the first image frame Frame #0, the second image frame Frame #1, the fourth image frame Frame #3, the sixth image frame Frame #5, and the like corresponding to each frame count.

The image generation controller 5 may transmit the first image frame Frame #1 to all three image receiving controllers 15, 20, and 25 through three Ethernet ports. For example, the image generation controller 5 may assign a first MAC address of 02: 00: 00: 10: 00: 05 to the first image frame Frame #0. The Ethernet switch 10 may transmit the first image frame Frame #0 through a first Ethernet port #0, a second Ethernet port #1, and a third Ethernet port #2 based on the first MAC address.

The image generation controller 5 may assign a second MAC address of 02: 00: 00: 10: 00: 00 to the second image frame Frame #1 and the third image frame Frame #2. The Ethernet switch 10 may transmit the second image frame Frame #1 and the third image frame Frame #2 through the first Ethernet port #0 based on the second MAC address.

The image generation controller 5 may assign a third MAC address of 02: 00: 00: 10: 00: 03 to the fourth image frame Frame #3. The Ethernet switch 10 may transmit the fourth image frame Frame #3 through the first Ethernet port #0 and the second Ethernet port #1 based on the third MAC address.

The image generation controller 5 may assign the second MAC address of 02: 00: 00: 10: 00: 00 to the fifth image frame Frame #4 similarly to the second image frame Frame #2. The Ethernet switch 10 may transmit the fifth image frame Frame #4 through the first Ethernet port #0 based on the second MAC address.

The image generation controller 5 may assign a fourth MAC address of 02: 00: 00: 10: 00: 04 to the sixth image frame Frame #5. The Ethernet switch 10 may transmit the sixth image frame Frame #5 through the first Ethernet port #0 and the third Ethernet port #2 based on the fourth MAC address.

The image generation controller 5 may receive 30 image frames from the first image frame Frame #0 to the thirtieth image frame (Frame #29) to each image receiving controller for 1 second, and then again assign the first MAC address of 02: 00: 00: 10: 00: 05 to a thirty-first image frame Frame #30. The Ethernet switch 10 may transmit the thirty-first image frame Frame #30 through the first Ethernet port #0, the second Ethernet port #2, and the third Ethernet port #3 based on the first MAC address.

In other words, the disclosed vehicle 1 is not limited to only two image receiving controllers, it is sufficient for the image generation controller 5 to assign different MAC addresses according to different frame counts and for the Ethernet switch 10 to transmit the image frames redundantly to different Ethernet ports according to the MAC addresses.

FIG. 6 is a flowchart illustrating a method of controlling a vehicle in some forms of the present disclosure.

Referring to FIG. 6, the image generation controller 5 may generate the plurality of image frames (200).

The image generation controller 5 may be an electronic control module that captures the peripheral or internal images of the vehicle 1 like a camera and transmits the plurality of image frames to the Ethernet switch 10 through the Ethernet communication.

The image generation controller 5 may assign different MAC addresses to the plurality of image frames based on a first frame count and a second frame count (210).

The image generation controller 5 may previously store the first frame count and the second frame count of the image receiving controllers 15 and 20 that receive the image frames, compare the first frame count and the second frame count, and assign different MAC addresses to the image frames according to the comparison result.

The image generation controller 5 may transmit the plurality of image frames to the Ethernet switch 10 (220).

The plurality of image frames may be transmitted according to the protocol of Ethernet communication corresponding to international standards, and the Ethernet switch 10 may route the transmitted image frames.

After receiving the plurality of image frames, the Ethernet switch 10 may determine the Ethernet port to be transmitted each image frame (230).

For example, the first Ethernet port #0 and the second Ethernet port #1 may match the first MAC address, and the second Ethernet port #1 may match the second MAC address.

The Ethernet switch 10 may transmit the first image frame to the first Ethernet port (240), and the first image receiving controller 15 may process the first image frame (241).

The Ethernet switch 10 may transmit the first image frame to the second Ethernet port #1 (250), and the Ethernet switch 10 may transmit the second image frame to the second Ethernet port #1 (251). The second image receiving controller 20 may process the first image frame and the second image frame (252).

Through this, the disclosed vehicle 1 may receive the image data according to the frame counts required by the image receiving controllers 15 and 20, and furthermore, since the image receiving controllers 15 and 20 can receive the image frames through the predetermined transmission interval, the difficulty of image processing may be reduced.

According to the vehicle and the method of controlling the vehicle in some forms of the present disclosure, by assigning a media access control (MAC) address in video frame units and mapping MAC address to ports of the Ethernet switch based on the number of video frames required by ECUs, the ECU that receives the image can receive the image frame without unnecessary increase of the Ethernet communication speed.

There is no need for a separate configuration to increase the Ethernet communication speed, the ECU can receive the image data for the required number of frames, and furthermore, since the ECU can receive the image frame through a constant transmission delay, the difficulty of image processing can be reduced.

Meanwhile, the disclosed forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
    an image generation controller configured to:
        generate a plurality of image frames;
        assign a first media access control (MAC) address to a first image frame of the plurality of image frames; and
        assign a second MAC address to a second image frame of the plurality of image frames;
    an Ethernet switch including a plurality of Ethernet ports configured to:
        transmit the first image frame to a first image receiving controller and a second image receiving controller based on the first MAC address; and
        transmit the second image frame to the second image receiving controller based on the second MAC address;
    the first image receiving controller configured to:
        receive the first image frame; and
        image process the first image frame; and the second image receiving controller configured to:
  receive the first image frame and the second image frame; and
  process the first image frame and the second image frame.

2. The vehicle according to claim 1, wherein the image generation controller is configured to assign the first MAC address and the second MAC address to the plurality of image frames based on a first frame count and a second frame count.

3. The vehicle according to claim 2, wherein the image generation controller is configured to generate the image frame based on a maximum frame count among the first frame count and the second frame count.

4. The vehicle according to claim 1, wherein the Ethernet switch comprises:
  a first Ethernet port connected to the first image receiving controller; and
  a second Ethernet port connected with the second image receiving controller.

5. The vehicle according to claim 4, wherein the Ethernet switch is configured to store an access control list (ACL) matching the first Ethernet port and the second Ethernet port to the first MAC address and matching the second Ethernet port to the second MAC address.

6. The vehicle according to claim 5, wherein the Ethernet switch is configured to connect the first Ethernet port to the first image receiving controller based on the ACL.

7. The vehicle according to claim 5, wherein the Ethernet switch is configured to connect the second Ethernet port to the second image receiving controller based on the ACL.

8. The vehicle according to claim 4, wherein the image generation controller is configured to:
  compare a first frame count and a second frame count;
  assign the first MAC address to the first image frame based on a comparison result; and
  assign the second MAC address to the second image frame.

9. The vehicle according to claim 1, wherein:
  the image generation controller comprises a camera,
  the first image receiving controller comprises an image recognition device, and
  the second image receiving controller comprises an audio video navigation (AVN).

10. A method of controlling a vehicle where the vehicle includes an image generation controller, an Ethernet switch, and a plurality of image receiving controllers, the method comprising:
  generating, by the image generation controller, a plurality of image frames;
  assigning, by the image generation controller, a first media access control (MAC) address to a first image frame of the plurality of image frames, and assigning a second MAC address to a second image frame of the plurality of image frames;
  transmitting, by the Ethernet switch, the first image frame to a first image receiving controller and a second image receiving controller based on the first MAC address, and transmitting the second image frame to the second image receiving controller based on the second MAC address;
  receiving, by the first image receiving controller, the first image frame;
  receiving, by the second image receiving controller, the first image frame and the second image frame; and
  processing, by the first image receiving controller and the second image receiving controller, the received image frame.

11. The method according to claim 10, wherein assigning the first MAC address and the second MAC address comprises:
  assigning the first MAC address and the second MAC address to the plurality of image frames based on a first frame count and a second frame count.

12. The method according to claim 10, wherein the Ethernet switch comprises:
  a first Ethernet port connected to the first image receiving controller; and
  a second Ethernet port connected with the second image receiving controller.

13. The method according to claim 12, wherein the method further comprises:
  storing, by the Ethernet switch, an access control list (ACL) matching the first Ethernet port and the second Ethernet port to the first MAC address and matching the second Ethernet port to the second MAC address.

14. The method according to claim 13, wherein transmitting the first image frame and the second image frame comprises:
  connecting the first Ethernet port to the first image receiving controller based on the ACL.

15. The method according to claim 13, wherein transmitting the first image frame and the second image frame comprises:
  connecting the second Ethernet port to the second image receiving controller based on the ACL.

16. The method according to claim 12, wherein assigning the first MAC address and the second MAC address comprises:
  comparing a first frame count and a second frame count;
  assigning the first MAC address to the first image frame based on a comparison result; and
  assigning the second MAC address to the second image frame.

17. The method according to claim 16, wherein assigning the first MAC address and the second MAC address comprises:
  assigning the first MAC address, the second MAC address, a third MAC address and a fourth MAC address to the plurality of image frames based on the first frame count, the second frame count, and a third frame count.

* * * * *